Patented June 7, 1938

2,119,531

UNITED STATES PATENT OFFICE 2,119,531

NEW CONDENSATION PRODUCTS OF ACETYLENIC COMPOUNDS

Harry B. Dykstra, Wilmington, Del., assignor to E. I. du Pont de Nemours & Company, Wilmington, Del., a corporation of Delaware No Drawing. Application January 5, 1934, Serial No. 705,367

26 Claims. (Cl. 260—2)

This invention relates to new reactions of unsaturated compounds and particularly to the condensation of halogenated ethers with acetylenic compounds. More specifically this invention relates to the reaction of alpha halogenated ethers with compounds having conjugate ene-ine unsaturation, such as monovinylacetylene.

An object of this invention is to react halogenated ethers with compounds containing an acetylenic linkage. A still further object is to react halogenated ethers with compounds containing a conjugated system of unsaturation comprising an acetylenic linkage. Another object is to prepare valuable products from compounds such as vinylacetylene, divinylacetylene and their derivatives. A still further object of this invention is to prepare additional useful products from the original condensation products by subsequent reactions such as polymerization and interpolymerization. Other objects will appear hereinafter.

These objects are preferably accomplished by reacting equimolal quantities of a halogenated ether and a compound containing an acetylenic linkage at suitable temperature and atmospheric pressure and in the presence of a catalyst such as bismuth chloride and a diluent. The products may be used as starting points for further syntheses, or polymerized by suitable treatment.

The halogenated ethers react with acetylenic compounds in the presence of bismuth chloride, or other suitable catalysts, to give principally mono-addition products. The best results are obtained by slowly adding equivalent quantities of the acetylenic compound and halogenated ether to a well stirred mixture of diluent such as diethyl ether and a suitable catalyst. Under these conditions the chief reaction product is a mono-addition compound. The rate of reaction and the yields vary with different acetylenic compounds and halogenated ethers. Alpha halogenated ethers are by far the most reactive.

In the case of the simple acetylenic compounds, e. g. acetylene, the addition products appear to be unsaturated gamma halogen ethers. In general the halogen in these products is relatively non-reactive. The products formed from acetylene and its lower homologues are liquids. The reaction may be expressed by the following general equation:

$$RC{\equiv}CR'+R''OCHXR''' \longrightarrow R''OCH(R''')C(R){=}C(R')X$$

in which X represents halogen and R, R', and R''' represent hydrogen or simple or substituted alkyl, aryl, alkaryl, or alicyclic groups and R'' represents a simple or substituted alkyl, aryl, alkaryl or alicyclic group.

In acetylenic compounds in which the acetylenic linkage forms a part of a conjugated system of unsaturation, e. g., with an olefinic linkage or with another acetylenic linkage, the reaction is more complex. For example, the reaction of vinylacetylene with chloromethyl ether appears to take place as follows:

$$CH{\equiv}CCH{=}CH_2+CH_3OCH_2Cl \longrightarrow CH_3OCH_2CH{=}C{=}CHCH_2Cl \quad (B)$$

Product B rearranges readily, especially in the presence of certain salts, notably cuprous chloride.

$$CH_3OCH_2CH{=}C{=}CHCH_2Cl \longrightarrow CH_3OCH_2CH{=}CClCH{=}CH_2 \quad (A)$$

This rearrangement takes place so readily that some of Product A is always found in the reaction mixture. Some evidence for the structures assigned to Products A and B was obtained from oxidation experiments. Evidence for these structures may also be obtained from the analogous reaction with hydrochloric acid and the rearrangement of the product in the presence of cuprous chloride.

$$CH{\equiv}CCH{=}CH_2+HCl \longrightarrow CH_2{=}C{=}CHCH_2Cl \quad (D)$$
$$CH_2{=}C{=}CHCH_2Cl \xrightarrow{(Cu_2Cl_2)} CH_2{=}CClCH{=}CH_2 \quad (C)$$

It will be apparent from the above reactions that general equations may be written as follows:

$$CH{\equiv}CCH{=}CH_2+RO\overset{R'}{\underset{|}{C}}HCl \longrightarrow RO\overset{R'}{\underset{|}{C}}HCH{=}C{=}CHCH_2Cl \quad (F)$$

$$RO\overset{R'}{\underset{|}{C}}H{=}C{=}CHCH_2Cl \longrightarrow RO\overset{R'}{\underset{|}{C}}HCH{=}CClCH{=}CH_2 \quad (E)$$

R may be a simple or substituted alkyl, alicyclic, alkaryl or aryl group and R' may be hydrogen or a simple or substituted alkyl, alicyclic, alkaryl or aryl group, and the possible combinations open up many possibilities. A product of the composition F may act as a starting point for many new syntheses as it contains a reactive halogen which can be replaced with other elements or groups, e. g., Br, I, OH, CH₃, CH₃O, CH₃COO, C₆H₅O, NH₂, etc. It is also possible to obtain interesting products by treating F with agents such as sodium methylate which remove hydrogen chloride.

Product E is analogous to Products A and C and like them may be polymerized to form a variety of products. The physical properties of the polymers differ with the mode of polymerization and with the nature of R and R'. In general the polymers have properties which are intermediate between those of resins and rubber. The rubber-like properties are undoubtedly due to the presence of the $-CH=CXCH=CH_2$ structure which characterizes such rubber forming compounds as isoprene and chloro-2-butadiene-1,3. The polymerization may be effected by means of heat or light with or without catalysts and solvents. Low temperature polymerization in the absence of a solvent or catalyst gives the hardest and toughest product. The polymers are initially soluble in esters, ketones, and aromatic hydrocarbons. On exposure to air, particularly in thin films, they become less soluble. This change is due to further polymerization, probably accompanied by some oxidation.

The following examples are presented to illustrate in greater detail the processes of this invention.

EXAMPLE 1

During the course of about 2 hours 156 grams of vinylacetylene and 241 grams of chloromethyl ether, $CH_3OCH_2Cl$, were added to a vigorously stirred mixture of 100 grams of anhydrous ether, 9 grams of bismuth chloride, and 0.5 gram of pyrogallol at 5–15° C. The stirring was continued for 7 hours, with periodic additions of bismuth chloride until a total of 13 grams was present in the mixture. Water was then added to the mixture and the upper layer was removed, dried over magnesium sulfate, and distilled. In this way there was obtained 60 grams of material boiling at 46° C./10 mm., 138 grams boiling at 60–61° C./10 mm., 21 grams boiling at 61° C./10 mm.—120° C./2 mm., and 38 grams of a dark resinous product. The fraction boiling at 46° C./10 mm. probably has the structure $CH_3OCH_2CH=CClCH=CH_2$ (A) and that boiling at 60–61° C./10 mm., the structure $$CH_3OCH_2CH=C=CHCH_2Cl \quad (B)$$

EXAMPLE 2

Equivalent amounts of alpha chloroethyl ethyl ether, $C_2H_5OCHClCH_3$ (prepared by passing hydrogen chloride into a mixture of paraldehyde and ethanol), and vinylacetylene were slowly added to a well stirred mixture of 100 grams of absolute ether and 2 grams of bismuth chloride maintained at 10° C. During the course of one hour, 378 grams of chloroether and 182 grams of vinylacetylene were added. The stirring was continued for 15 hours with periodic additions of bismuth chloride until a total of 18 grams was present. The mixture was then allowed to stand for 8 hours at 5–15° C. Water was added and the ether layer separated and dried over magnesium sulfate. On distillation over pyrogallol, 300 grams of mono-addition products was obtained boiling at 42–60° C./4 mm., and 34 grams of higher boiling material including resin. This represents a 51% conversion of vinylacetylene to mono-addition products. Redistillation of the mono-addition products gave a 64 gram fraction boiling at 42–56° C./4 mm. and 184 gram fraction boiling at 56° C./4 mm. This result indicates the presence of at least two isomers. The higher boiling isomer rearranges under the influence of hydrogen chloride and cuprous chloride to give a lower-boiling, polymerizable isomer boiling at 44° C./4 mm.

EXAMPLE 3

Following the method described in the previous examples, a mixture of 683 grams of alpha chloroethyl butyl ether, $C_4H_9OCHClCH_3$, (prepared by passing hydrogen chloride into a mixture of paraldehyde and butanol), 260 grams of vinylacetylene, 300 grams of ether, and 15 grams of bismuth chloride was stirred at 5–10° C. for 24 hours. On working up the reaction mixture there was obtained: (1) 120 grams of liquid boiling at 40–44° C./2 mm., (2) 502 grams of liquid boiling at 60–80° C./2 mm., and (3) 60 grams of dark viscous residue. Fraction 1 contained 26.16% chlorine, 14.7% of which was reactive, and it had the following properties:

$$d_4^{20} 0.9796;\ n_D^{20} 1.4697$$

Fraction 2 was found to consist of a mixture of mono-addition products of chloroethyl butyl ether and vinylacetylene, with the chief constituent boiling at 79° C./2 mm. An isomer boiling at 67° C./2 mm. was also present.

EXAMPLE 4

Following the procedure described in Examples 1 and 2, a mixture of 92 grams of dichloromethyl ether, $CH_2ClOCH_2Cl$, 42 grams of vinylacetylene, 40 grams of ether and 4 grams of bismuth chloride was stirred for 7 hours at 10–20° C. The products obtained consisted of 3 grams of liquid boiling at 40–80° C./3 mm., 5 grams boiling at 120–150° C./3 mm., and 7 grams of dark viscous material. Analytical data indicated that the higher boiling fraction was formed by the addition of two mols of vinylacetylene to one of dichloroether.

EXAMPLE 5

Into a liter flask equipped with a mercury seal stirrer and reflux condenser was introduced 300 cc. of anhydrous ether and 4 grams of bismuth chloride. A solution of 78 grams of divinylacetylene in 80 grams of chloromethyl ether was added dropwise during two hours to the well agitated ethereal solution. After it had stood 16 hours at room temperature, it was treated with a large volume of cold water. The ether and water layers were decanted from the large amount of tarry-granular product, and the ethereal solution was separated, washed, and dried over calcium chloride. Upon distillation the ethereal solution yielded a yellow oil which boiled at 53–59° C./1 mm.; $n_D^{20}$ 1.4913; $d_4^{20}$ 1.0239; Cl, 22.51%. These data indicate a mono-addition product, i. e., $C_8H_{11}OCl$, with the structure of $$CH_3OCH_2CH_2CH=C=CClCH=CH_2$$

EXAMPLE 6

A mixture of 20 grams of chloromethyl ether, 1 gram of bismuth chloride, and 22 grams of 4-methoxy-2-butyne, $CH_3-C\equiv CCH_2OCH_3$ (prepared as described in copending application of Carothers and Jacobson, Serial No. 666,170, filed April 14, 1933) was stirred at 50–55° C. for 30 minutes. Water was then added and the ether layer separated, dried, and distilled. In addition to unreacted 4-methoxy-2-butyne, there was obtained 10 grams of liquid boiling at 80–95° C./30 mm. and 2 grams of resinous material. The liquid was a mixture of condensation products of 4 methoxy-2-butyne and chloromethyl ether.

EXAMPLE 7

A mixture of 26 grams vinylacetylene and 41 grams chloromethyl ether was placed in a pressure bottle and shaken at 20–30° C. for three days. On working up the reaction mixture in the usual manner about 1 gram of condensation product was obtained. Most of the vinylacetylene was recovered unchanged.

EXAMPLE 8
*Isomerization*

A mixture of 200 grams of the higher boiling mono-addition product from Example 1 (Product B), 50 grams of ether, 10 grams of cuprous chloride, and 50 grams of 18% hydrochloric acid was stirred at 20–40° C. for 1.5 hours. The ether layer was then separated and dried over magnesium sulfate. On distillation, 162 grams of the lower-boiling isomer (Product A in Example 1) was obtained.

EXAMPLE 9
*Polymerization*

10 grams of the lower-boiling mono-addition product of alpha chloroethyl ether and vinylacetylene from Example 2, was heated for 48 hours at 65–70° C. On heating the product at 100° C./2 mm. for a few hours to remove residual monomer, there was obtained 9 grams of a soft, light-colored polymer. This represented a 90% yield. The polymer was readily soluble in ketone, ester, and aromatic hydrocarbon solvents.

EXAMPLE 10

A solution of 0.16 gram of maleic anhydride in 8 grams of the lower-boiling mono-addition product of chloromethyl ether and vinylacetylene (Example 1) was heated at 80° C. After 10 hours substantially complete polymerization had taken place. The polymer was a soft, light-colored resin readily soluble in acetone, ethyl acetate and benzene. It gave films which dried rather slowly but which ultimately became hard and insoluble.

Catalysts other than maleic anhydride may be used to induce polymerization or the catalyst may be omitted. Benzoyl peroxide has been used successfully as a catalyst.

EXAMPLE 11
*Interpolymerization*

A mixture of 8 grams of styrene and 8 grams of the lower-boiling mono-addition product of vinylacetylene and chloromethyl ether (Example 1) was heated at 60–75° C. for 4 days. Substantially complete polymerization occurred. The polymer was a light colored resin, considerably harder than that obtainable from the chloromethyl ether derivative alone.

EXAMPLE 12

17½ grams of the lower-boiling mono-addition product of Example 1 and 157.5 grams of chloro-2-butadiene-1,3 [for description see J. Am. Chem. Soc. 53, 4203 (1931)] were added with vigorous stirring to 175 grams of a 2% sodium oleate solution. After standing at room temperature for 24 hours, 1.5% of phenyl beta naphthylamine and 15 cc. of dilute ammonium hydroxide were added and the latex cast into a film. The film was dried for 3 hours at 120° C. and placed in a refrigerator maintained at 0° C. After 64 hours the film was still pliable, whereas a control film made from polymerized chloro-2-butadiene-1,3 alone had become very stiff. At 234 hours the test film showed only a slight tendency to freeze.

EXAMPLE 13
*Applications*

A lacquer was made by mixing 10 grams of the polymer of the lower-boiling mono-addition product of Example 1, with 10 grams of toluene and 10 grams of butyl acetate. The lacquer gave clear films which became dust-free in about 15 minutes and hard in about 24 hours. (The rate of drying may be reduced by heating the films for 2 hours at 60° C.) The films were tough and showed good flexibility and adhesion. After a few weeks exposure to air the films were relatively insoluble in organic solvents. The films were somewhat thermoplastic but it was found that this could be overcome by incorporating modifying agents such as pigments, oils, cellulose derivatives, and other resins—for example vinyl resins or resins of the polybasic acid-polyhydric alcohol type. The addition of softeners such as dibutylphthalate, tricresylphosphate, etc., was found to be advantageous for improving the flexibility of the films.

EXAMPLE 14

A quantity of the polymer of the lower-boiling mono-addition product of Example 1 was pressed between two glass plates at 60° C. and a pressure of 80 pounds per square inch until the thickness of the resin between the glass was 0.02 inch. Break and crush tests showed excellent adhesion between the resin and glass.

The resin used above was employed successfully as a bonding agent for glass and sheets of cellulose nitrate, cellulose acetate, vinyl resins and the like.

In some cases improved adhesion was obtained by adding softeners of the type mentioned in Example 13.

Several chloroethers are included in the examples. Among other chloroethers which may be used are methyl alpha-chloroethyl ether, alpha-beta-dichloroethyl ethyl ether, chloromethyl propyl ether, alpha-chloroethyl amyl ether, alpha-chloroethyl dodecyl ether, chloromethyl octadecyl ether, chloromethyl cyclo-hexyl ether, chloromethyl benzyl ether, and alpha-chloroethyl phenyl ether. The reaction is also applicable to other haloethers. The bromo and iodo derivatives may be prepared as follows: The bromo and iodo ethers may be employed in the reactions with acetylenic compounds directly, or the final chloro derivatives may be converted to the corresponding bromo or iodo compounds by treatment with solutions of salts such as sodium bromide and sodium iodide.

As indicated in the examples the reactions covered by this invention may be carried out in the presence, or in the absence, of a solvent. Since the reaction is more easily controlled when carried out in solution this method is to be preferred. The only solvent mentioned in the examples is ethyl ether, but the invention need not be so limited since other ethers may be used, for example, propyl ether, isopropyl ether, butyl ether, ligroin, etc. In fact any solvent may be used which is inert chemically to the reactants.

When it is desired to prepare the mono-addition products it is generally desirable to use the reactants in molar proportions, but it is within the scope of the present invention to use the reactants in other proportions. Since, however, the mono-addition products are still unsaturated, use of an excess of haloether leads to further reaction between the primary products and the haloether.

The use of but one catalyst, bismuth chloride, has been described in the examples but it is to be understood that this invention is not to be limited to the use of this preferred catalyst alone. Metal halides that are hydrolyzable and at least somewhat soluble in the reaction mixtures form satisfactory catalysts either when used alone or in combination. Such halides are, for example, bismuth bromide, antimony chloride, stannic chloride, zinc chloride, ferric chloride, aluminum chloride, and cuprous chloride. Although cuprous chloride is not so effective a catalyst as bismuth chloride, its use with chloromethyl ether and vinylacetylene has been found to give a higher ratio of Product A : Product B (see Example 1) than that obtained with bismuth chloride. Condensation will take place to a limited degree without the use of a catalyst. Varying amounts of catalyst will be employed, depending on the nature of the reactants. The catalyst may all be added before the reaction is started or it may be added in small amounts periodically during the course of the reaction.

The preferred temperature range for the reactions of this invention differs with the different reactants. For the reaction of chloroethers with vinylacetylene, temperatures between —5° C. and 25° C. seem to be most satisfactory, but lower temperatures may be used successfully and the upper temperature limit may be as high as the boiling points of the reactants will permit.

Although atmospheric pressure is generally satisfactory, moderate pressures may be employed with success, depending somewhat on the nature of the reactants of a given condensation.

In general this invention includes within its scope compounds containing an acetylenic linkage, preferably the compound will contain conjugate acetylenic and olefinic linkages. For example the compounds which may be used will include acetylene and its homologues, e. g., allylene, propyl acetylene, phenyl acetylene, etc., diacetylene, dipropargyl, vinylacetylene and its homologues, such as methyl-2-butene-1-yne-3 and dimethyl-1,2-buten-1-yne-3, both of which are described in the copending application of Carothers and Coffman, Serial No. 569,832, filed Oct. 19, 1931 which has now matured into U. S. Patent No. 1,950,441, issued March 13, 1934; divinylacetylene and homologues of divinylacetylene, such as 5-methyl-1,5-hexadiene-3-yne ($CH_2=CHC\equiv C-C(CH_3)=CH_2$), and other hydrocarbons containing conjugate unsaturation involving an acetylenic linkage. The reaction is also applicable to other types of compounds than hydrocarbons, provided an acetylenic linkage is present. As compounds of this type might be mentioned acetylenic ethers and esters, e. g., 4-ethoxy-2-butyne and 4-butoxy-2-butyne described in copending application of Carothers and Jacobson, Serial No. 666,170, filed April 14, 1933, and propargyl acetate.

The lower-boiling mono-addition products obtained from compounds containing conjugate unsaturation involving an acetylenic linkage, as indicated in the examples, can be polymerized. Methods for the polymerization of vinyl esters, dienes, etc. are applicable to these condensation products. The properties of the polymers vary with the conditions employed in the polymerization; for example, polymerization by heat in the presence of a solvent gives a lower molecular weight polymer than polymerization by means of light at ordinary temperatures in the absence of a solvent. Polymerization may also be effected in emulsion form. Modified products can be prepared by polymerizing the compounds in the presence of film-forming materials such as drying oils, resins, cellulose derivatives, pigments, plasticizers, etc., or by polymerizing the compounds in the presence of other polymerizable materials, e. g., vinyl acetate, styrene, chloro-2-butadiene-1,3, acrylic acid esters, methacrylic acid esters, etc.

As indicated above, the simple addition products obtained by reacting a haloether with a compound containing conjugate unsaturation involving an acetylenic linkage, may be further treated to isolate single isomers, or the isomer of the type "F" or the type "B", above described may be warmed in the presence of a cuprous halide and a hydrogen halide to produce respectively compounds of the types "E" and "A", above.

By the process of this invention a series of new compounds is produced that may be used to advantage in many ways. In the case of compounds containing an isolated acetylenic linkage, the new products are generally simple or substituted gamma halogen ethers; with compounds containing a conjugated system of unsaturation involving an acetylenic linkage the products appear to consist principally of gamma and epsilon halogen substituted ethers. As the compounds formed are not completely saturated, they offer possibilities of further addition and condensation. The products formed by our invention may be polymerized, interpolymerized, and in certain cases may be isomerized to form a great variety of compounds.

These new compounds, depending upon their properties, are useful for coating compositions, impregnating agents, soldering fluxes, adhesives (as in laminated glass), molding compositions, solvents and as softening agents, e. g., for polymerized chloro-2-butadiene-1,3.

It will be apparent that many widely different embodiments of this invention may be made without departing from the spirit and scope thereof, therefore, this invention is not intended to be limited except as indicated in the appended claims.

I claim:

1. The process which comprises reacting a compound containing an acetylenic linkage with an alpha halogenated ether in which the halogen is attached to an open chain carbon atom.

2. The process which comprises reacting a compound containing conjugate acetylenic and olefinic linkages with an alpha halogenated ether in which the halogen is attached to an open chain carbon atom.

3. The process which comprises reacting a compound containing an acetylenic linkage with an alpha halogenated ether in which the halogen is attached to an open chain carbon atom in the presence of a hydrolyzable metal halide.

4. The process which comprises reacting a compound containing conjugate acetylenic and olefinic linkages with an alpha halogenated ether in which the halogen is attached to an open chain carbon atom in the presence of a hydrolyzable metal halide.

5. The process which comprises reacting a hydrocarbon containing conjugate acetylenic and olefinic linkages with an alpha chlorinated ether in which the chlorine is attached to an open chain carbon atom in the presence of a solvent and a hydrolyzable metal halide, at least somewhat soluble in the reaction mixture.

6. The process which comprises reacting vinylacetylene with an alpha chlorinated ether, in which the chlorine is attached to an open chain carbon atom in the presence of a solvent and a hydrolyzable metal chloride, at least somewhat soluble in the reaction mixture.

7. The process which comprises reacting divinylacetylene with an alpha chlorinated ether, in which the chlorine is attached to an open chain carbon atom in the presence of a hydrolyzable metal chloride, at least somewhat soluble in the reaction mixture.

8. The process which comprises reacting vinylacetylene with an alpha chlorinated ether in which the chlorine is attached to an open chain carbon atom in the presence of a solvent and bismuth chloride at a temperature of −5 to 25° C., the reactants being present in substantially molar proportions.

9. The process which comprises reacting a compound containing an acetylenic linkage with an alpha halogenated ether in which the halogen is attached to an open chain carbon atom and then polymerizing the resulting polymerizable product.

10. The process which comprises reacting a hydrocarbon containing conjugate acetylenic and olefinic linkages with an alpha halogenated ether, in which the halogen is attached to an open chain carbon atom and then polymerizing the resulting polymerizable product.

11. The process which comprises reacting a hydrocarbon containing conjugate acetylenic and olefinic linkages with an alpha halogenated ether, in which the halogen is attached to an open chain carbon atom and then polymerizing the resulting polymerizable product in the presence of another polymerizable substance.

12. A product obtained by reacting a compound containing an acetylenic linkage with an alpha halogenated ether in which the halogen is attached to an open chain carbon atom.

13. A product obtained by reacting vinylacetylene with an alpha halogenated ether in which the halogen is attached to an open chain carbon atom in the presence of a solvent and a hydrolyzable metal halide, at least somewhat soluble in the reaction mixture.

14. A product obtained by reacting divinylacetylene with an alpha halogenated ether in which the halogen is attached to an open chain carbon atom in the presence of a solvent and a hydrolyzable metal halide, at least somewhat soluble in the reaction mixture.

15. A polymer of a polymerizable product obtained by reacting a compound containing conjugate acetylenic and olefinic linkages with an alpha halogenated ether in which the halogen is attached to an open chain carbon atom.

16. A product obtained by reacting a compound containing conjugate acetylenic and olefinic linkages with an alpha halogenated ether in which the halogen is attached to an open chain carbon atom.

17. The process which comprises reacting a hydrocarbon containing an acetylenic linkage with an alpha chlorinated ether in which the chlorine is attached to an open chain carbon atom in the presence of a hydrolyzable metal halide.

18. The process which comprises reacting vinylacetylene with an alpha chloroethyl ether in substantially molar proportions and in the presence of bismuth chloride and a solvent for the reactants in which the bismuth chloride is at least somewhat soluble and then separating the reaction products by fractional distillation.

19. A process as described in claim 5, further characterized in that the chlorinated ether is an ether of the general formula ROCH(Cl)R′ in which R is a low molecular weight saturated hydrocarbon radical and R′ is a member of the group consisting of hydrogen and low molecular weight saturated hydrocarbon radicals.

20. The process which comprises reacting vinylacetylene with an alpha chlorinated ether of the general formula ROCH(Cl)R′ in which R is a low molecular weight saturated hydrocarbon radical and R′ is a member of the group consisting of hydrogen and low molecular weight saturated hydrocarbon radicals, in the presence of a solvent and a hydrolyzable metal chloride, at least somewhat soluble in the reaction mixture.

21. The process which comprises reacting divinylacetylene with an alpha chlorinated ether of the general formula ROCH(Cl)R′ in which R is a low molecular weight saturated hydrocarbon radical and R′ is a member of the group consisting of hydrogen and low molecular weight saturated hydrocarbon radicals, in the presence of a solvent and a hydrolyzable metal chloride, at least somewhat soluble in the reaction mixture.

22. The process which comprises reacting a hydrocarbon containing conjugate acetylenic and olefinic linkages with an alpha chlorinated ether in which the chlorine is attached to an open chain carbon atom and treating the resulting nonpolymerizable mono- addition product with cuprous chloride.

23. The process which comprises reacting a hydrocarbon containing conjugate acetylenic and olefinic linkages with an alpha chlorinated ether in which the chlorine is attached to an open chain carbon atom, treating the resulting nonpolymerizable mono- addition product with cuprous chloride and polymerizing the thereby produced polymerizable product.

24. A polymerizable product obtained by reacting a compound containing acetylenic and olefinic linkages with an alpha halogenated ether in which the halogen is attached to an open chain carbon atom and treating the reaction mass with cuprous chloride.

25. A product obtained by reacting vinylacetylene with an alpha chlorinated ether of the general formula ROCH(Cl)R′ in which R is a low molecular weight saturated hydrocarbon radical and R′ is a member of the group consisting of hydrogen and low molecular weight saturated hydrocarbon radicals, in the presence of a solvent and a hydrolyzable metal chloride, at least somewhat soluble in the reaction mixture.

26. A product obtained by reacting divinylacetylene with an alpha chlorinated ether of the general formula ROCH(Cl)R′ in which R is a low molecular weight saturated hydrocarbon radical and R′ is a member of the group consisting of hydrogen and low molecular weight saturated hydrocarbon radicals, in the presence of a solvent and a hydrolyzable metal chloride, at least somewhat soluble in the reaction mixture.

HARRY B. DYKSTRA.